United States Patent
Tang (10) Patent No.: US 8,855,577 B2
(45) Date of Patent: Oct. 7, 2014

(54) SYSTEM AND METHOD FOR ASSISTED OPEN LOOP MULTIPLE INPUT, MULTIPLE OUTPUT COMMUNICATIONS

(75) Inventor: Yang Tang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 698 days.

(21) Appl. No.: 13/011,639

(22) Filed: Jan. 21, 2011

(65) Prior Publication Data

US 2012/0190309 A1   Jul. 26, 2012

(51) Int. Cl.
*H04B 7/00* (2006.01)
*H04B 7/04* (2006.01)
*H04B 7/06* (2006.01)

(52) U.S. Cl.
CPC ............ *H04B 7/0632* (2013.01); *H04B 7/0413* (2013.01); *H04B 7/065* (2013.01)
USPC .......................................................... 455/69

(58) Field of Classification Search
USPC .......................................................... 455/69
See application file for complete search history.

(56) References Cited

U.S. PATENT DOCUMENTS

| | | | |
|---|---|---|---|
| 7,460,494 B2* | 12/2008 | Sandhu | 370/264 |
| 2008/0108310 A1* | 5/2008 | Tong et al. | 455/69 |
| 2009/0041148 A1 | 2/2009 | Li et al. | |
| 2009/0202016 A1 | 8/2009 | Seong et al. | |

FOREIGN PATENT DOCUMENTS

| | | |
|---|---|---|
| CN | 101505205 A | 8/2009 |
| CN | 101626264 A | 1/2010 |
| CN | 101939928 A | 1/2011 |
| WO | WO2012/097591 | 7/2012 |

OTHER PUBLICATIONS

"Way Forward on further details about PUCCH," 3GPP TSG RAN WG1 63, R1-106514, Nov. 15-19, 2010, 3 pages, Jacksonvilee, USA.
International Search Report for PCT/CN2011/078697, mailed Dec. 1, 2011, 4 pages.

* cited by examiner

*Primary Examiner* — David Bilodeau
(74) *Attorney, Agent, or Firm* — Slater & Matsil, L.L.P.

(57) ABSTRACT

A system and method for assisted open loop (OL) multiple input, multiple output (MIMO) communications are provided. A method for controller operations includes: adjusting a transmitter used to transmit information in OL MIMO transmissions, the adjusting based on partial channel information for a channel between a controller and a communications device; and transmitting to the communications device using the adjusted transmitter.

30 Claims, 7 Drawing Sheets

SYSTEM AND METHOD FOR ASSISTED OPEN LOOP MULTIPLE INPUT, MULTIPLE OUTPUT COMMUNICATIONS

TECHNICAL FIELD

The present invention relates generally to wireless communications, and more particularly to a system and method for assisted open loop (OL) multiple input, multiple output (MIMO) communications.

BACKGROUND

Generally, closed loop (CL) MIMO communications may be defined as a precoding technique wherein an associated precoder is determined by a channel realization and/or interference precoding/channel realization. In order to facilitate the precoding in CL MIMO, channel state information (CSI) may be required. If channel reciprocity is not available, such as in frequency division duplex (FDD) communications systems, then the CSI may need to be fedback from a receiver of the communications (such as a mobile station, also commonly referred to as a user, subscriber, terminal, mobile, User Equipment, and so on) to a transmitter of the communications (such as a base station, also commonly referred to as a controller, NodeB, enhanced NodeB, and so forth). In time division duplex (TDD) communications systems, channel reciprocity may be assumed and CSI feedback may not be necessary; and the CSI may be determined from an alternate channel using channel reciprocity.

With the CSI available at the transmitter, either through channel reciprocity or explicit CSI feedback, the precoder is expected to fit the channel realization and/or the interference environments to achieve better beamforming/diversity gain. However, due to imperfections of CSI feedback, e.g., due to feedback delay, transmission error, quantization error, channel variation, and so on, the precoder and therefore CL MIMO might not be able to practically fulfill the performance potential and sometimes the communications system performance may be severely degraded.

Conventional OL MIMO, on the other hand, may be defined as a precoding technique wherein the precoder is predetermined at the transmitter and is independent of channel realization. Unlike CL MIMO, conventional OL MIMO does not require CSI information (either through channel reciprocity or explicit feedback) and therefore is more robust to channel variations in time, frequency, and/or space domains. However, conventional OL MIMO may not exploit any CSI at the transmitter and therefore, the corresponding performance is limited.

SUMMARY OF THE INVENTION

These and other problems are generally solved or circumvented, and technical advantages are generally achieved, by example embodiments of the present invention which provide a system and method for assisted OL MIMO communications.

In accordance with an example embodiment of the present invention, a method for controller operations is provided. The method includes: adjusting a transmitter used to transmit information in open loop (OL) multiple input, multiple output (MIMO) transmissions, the adjusting based on partial channel information for a channel between a controller and a communications device; and transmitting to the communications device using the adjusted transmitter.

In accordance with another example embodiment of the present invention, a method for communications device operations is provided. The method includes: determining partial channel information for a channel between a controller and a communications device; transmitting the partial channel information to the controller; and receiving a transmission from the controller. The transmission is precoded based on the partial channel information, and an open loop multiple input, multiple output transmission technique is used.

In accordance with another example embodiment of the present invention, a controller is provided. The controller includes: a precoder; and a transmitter coupled to the precoder. The precoder adjusts information in open loop (OL) multiple input, multiple output (MIMO) transmissions, the adjusting is based on partial channel information for a channel between a controller and a communications device; and the transmitter transmits the adjusted information to the communications device One advantage disclosed herein is that with the use of partial channel information, the performance of OL MIMO may be improved.

A further advantage of exemplary embodiments is that the use of partial channel information does not require frequent channel information feedback, therefore, the impact on communications overhead may be minimal.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a communications system that supports OL MIMO, such as those that are Third Generation Partnership Project (3GPP) Long Term Evolution (LTE), 3GPP LTE-Advanced (LTE-A), WiMAX, and so forth, compliant. The embodiments may be applied to both single user (SU) OL MIMO and multiuser (MU) OL MIMO communications.

Figure 1:
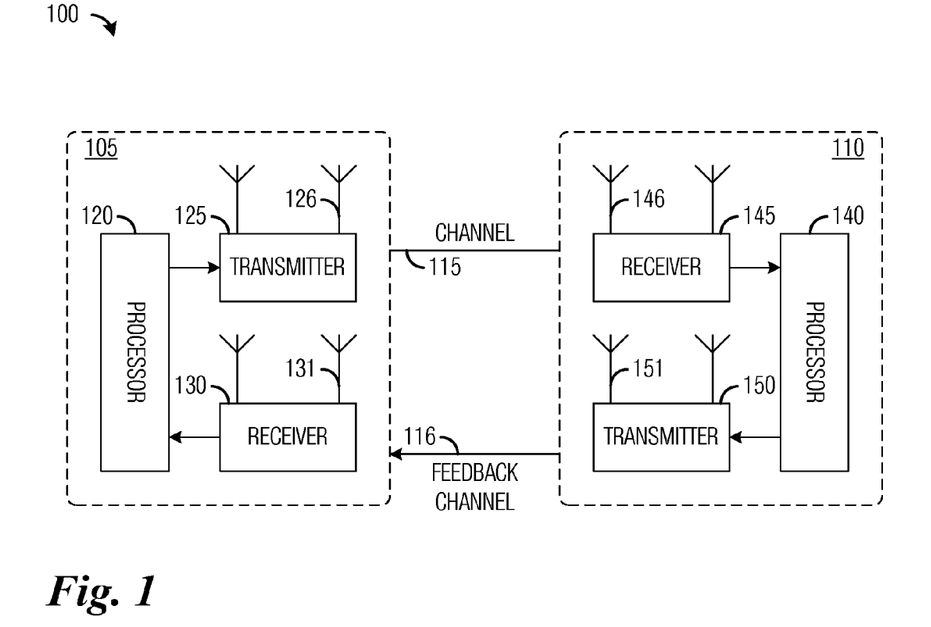
FIG. 1 illustrates an example diagram of a portion of a communications system.

FIG. 1 illustrates a portion of a communications system 100. Communications system 100 includes a base station (BS) 105 and a mobile station (MS) 110. BS 105 communicates with MS 110 over channel 115. When operating in CL mode (e.g., CL MIMO), MS 110 feeds back information, including channel information, to BS 105 over feedback channel 116. While in convention OL mode (e.g., OL MIMO), MS 110 does not feed back information to BS 105. Channel 115 may include a downlink (DL) channel (from BS 105 to MS 110) and an uplink (UL) channel (from MS 110 to BS 105), while feedback channel 116 may be used exclusively for MS 110 to transmit information back to BS 105.

BS 105 includes a processor 120, a transmitter 125 with at least one transmit antenna 126, and a receiver 130 with at least one receive antenna 131. Similarly, MS 110 includes a processor 140, a receiver 145 with at least one receive antenna 146, and a transmitter 150 with at least one transmit antenna 151.

Receiver 145 of MS 110 receives transmissions made by transmitter 125 of BS 105 and, if operating in the CL mode, from the received transmissions, processor 140 may compute channel information, such as channel mean, channel correlation matrix, and so forth. If operating in the OL mode, no channel information may be computed, while if operating in an enhanced OL mode, some channel information, such as partial channel information (e.g., long term channel statistics, wideband channel information, outdated channel information, inaccurate channel information, functions thereof, subsets thereof, and so forth) may be computed. The channel information (in full or partial form) may be transmitted back to BS 105, where it is received by receiver 130 and provided to processor 120 that makes use of the channel information to design future transmissions.

The channel information fedback to BS 105 by MS 110 may be in the form of time domain channel information or frequency domain channel information or a combination thereof. Time domain channel information may be in the form of short term channel information or long term channel information, while frequency domain channel information may be in the form of subband channel information or wideband channel information. In general, long term channel information and/or wideband channel information may be collectively referred to as channel statistics. Short term channel information may include channel mean, and so on.

As their names imply, short term channel information provide an instantaneous or snap-shot view of channel conditions, while long term channel information provide views of trends in channel condition. As such, short term channel information may be short-lived in its usefulness and may need to be generated, reported, and/or used in a relatively small time span and long term channel information may be more enduring, potentially enabling long periods of time to elapse between generating, reporting, and/or using. As an example, if a frequency for generating, reporting, and/or using of short term channel information is X, then typical frequency ranges for generating, reporting, and/or using of short term channel information may be $\frac{1}{10}$-th, $\frac{1}{100}$-th, or even $\frac{1}{1000}$-th X, depending on the nature of the long term channel information.

Examples of long term channel information include long term channel statistics, a function of the long term channel statistics, a time domain channel correlation matrix R, eigenvectors of the time domain channel correlation matrix R, eigenvalues of the time domain channel correlation matrix R, angle of arrival and/or angle of departure of the channel, and so forth. Examples of wideband channel information include wideband channel characteristics, a function of the wideband channel statistics, a wideband channel correlation matrix, eigenvectors of the wideband channel correlation matrix, eigenvalues of the wideband channel correlation matrix, angle of arrival and/or angle of departure of the channel, and so on.

The discussion provided below focuses mainly on time domain partial channel information, e.g., long term channel information, functions thereof, subsets thereof, and so on. However, the embodiments presented herein may be operable with either time domain partial channel information or frequency domain partial channel information, such as wideband channel information, outdated channel information, inaccurate channel information, functions thereof, subsets thereof, or a combination thereof. Therefore, the discussion of time domain partial channel information should not be construed as being limiting to either the scope or the spirit of the embodiments.

Figure 2A:
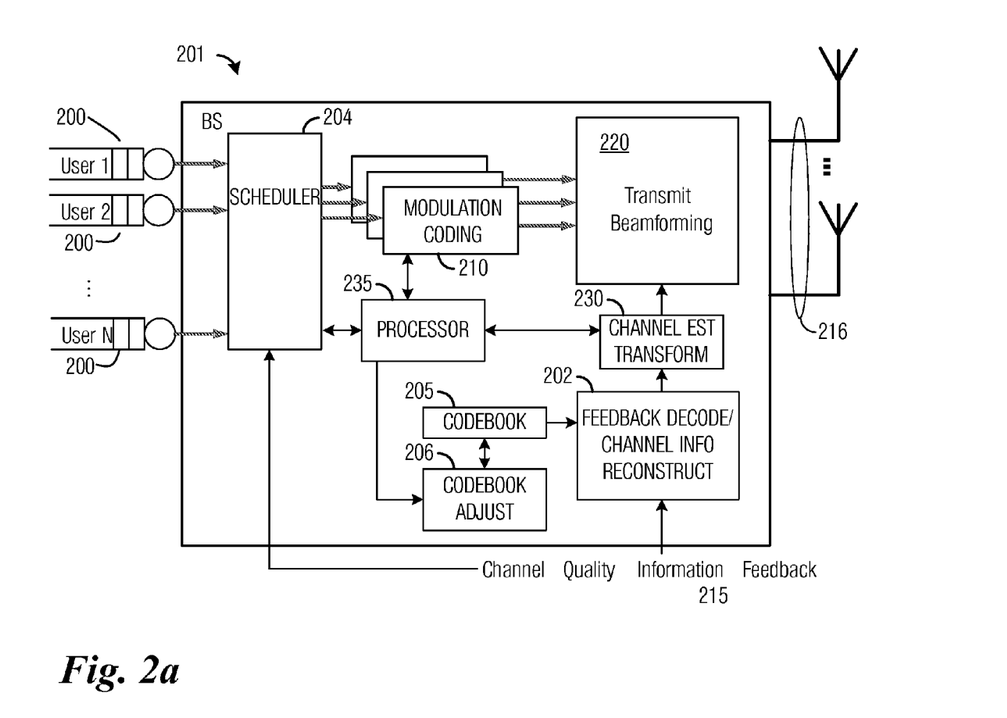
FIG. 2a illustrates an example diagram of a BS according to example embodiments described herein.

FIG. 2a illustrates a BS 201. Data 200, in the form of bits, symbols, or packets for example, destined for a plurality of MSs being served are sent to a scheduler 204, which decides which MSs will be transmitted to in a given time/frequency opportunity. For example, with MU-MIMO, scheduler 204 may select L out of K MSs for transmission at a given time, where K and L are integer values and L is less than or equal to K. The selection of the L MSs may be based on factors such as maximizing throughput, service history, MS priority, information priority, and so forth. While for SU-MIMO, scheduler 204 may select single MSs for transmission at a given time.

Data for MSs are processed by modulation and coding block 210 to convert to transmitted symbols and add redundancy for the purpose of assisting with error correction or error detection. The modulation and coding scheme is chosen based in part on information about the channel quality information feedback 215.

The output of modulation and coding block 210 is passed to a transmit beamforming block 220, which maps the modulated and coded stream for each MS onto a beamforming vector. The beamformed outputs are coupled to antennas 216 through RF circuitry. The transmit beamforming vectors may be determined by transmit beamforming block 220, which may determine the transmit beamforming vectors based on channel quality information feedback 215 as well as information from scheduler 204, which may include information regarding the MSs selected for transmission, and so on.

Feedback decode/channel information reconstruct unit 202 decodes feedback information from channel quality information feedback 215, which depending on operating mode may include full channel information when BS 201 is operating in a CL mode, no channel information when BS 201 is operating in an OL mode, or partial channel information when BS 201 is operating in an enhanced OL mode. Decoding feedback information may involve the use of a codebook 205 if channel quality information feedback 215 was quantized using a codebook by a MS. Codebook 205 may be a baseline codebook as specified by a technical standard, provided by an operator of a communications system that includes BS 201, or so forth. Alternatively, codebook 205 may be an adapted codebook that is originally a baseline codebook or another codebook that has been adapted using long term channel information (in full or partial form) or a function of long term channel information provided by the MS.

Adaptation of codebook 205 may be performed by codebook adjust unit 206. Codebook adjust unit 206 may adapt codebook 205 using feedback information provided in channel quality information feedback 215. Codebook adjust unit 206 may also make use of transforms stored in a memory to transform the baseline codebook. Codebook 205 may be implemented as a memory capable of storing a number of different codebooks, such as different baseline codebooks for different channel models, different codebooks for different MSs, different adapted codebooks for different MSs, and so forth.

Additionally, channel quality information feedback 215 may be encoded to protect from transmission errors. If so protected, feedback decode/channel information reconstruct unit 202 may remove the encoding used to protect channel quality information feedback 215 to produce feedback information.

Output of feedback decode/channel information reconstruct unit 202 (e.g., channel state information, channel statistics, channel correlation matrices, and so forth) may be provided to channel estimate transform unit 230. Channel estimate transform unit 230 may be used to transform an estimate of the channel to comply with a transformed channel model used at the MS. For example, channel estimate transform unit 230 may transform the channel estimate into a subspace of the channel, e.g., a long term channel eigenspace or a wideband channel eigenspace, representation of the channel estimate. Additional details on the transformed channel model are provided below. Channel quality information feedback 215 may also be provided to scheduler 204, which may use the information in its scheduling of MSs.

Scheduler 204 may use any of the known scheduling disciplines in the literature including round robin, maximum sum rate, proportional fair, minimum remaining processing time, or maximum weighted sum rate; generally scheduling decisions are based on channel quality information feedback 215 received from the plurality of MSs. Scheduler 204 may decide to send information to a single MS via transmit beamforming (SU-MIMO) or may decide to serve multiple MSs simultaneously through MU-MIMO communications.

Modulation and coding block 210 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment may be made based on channel quality information feedback 215 in a preferred embodiment and may be determined jointly in scheduler 204.

While not explicitly illustrated, it is obvious to those of ordinary skill in the art that OFDM modulation can be used. Further, any number of multiple access techniques could be used including orthogonal frequency division multiple access, code division multiple access, frequency division multiple access, or time division multiple access. The multiple access technique may be combined with the modulation and coding block 210 or the transmit beamforming block 220 among others.

Channel quality information feedback 215 may, for purposes of illustration, be in the form of quantized channel measurements, modulation, coding, and/or spatial formatting decisions, received signal strength, and signal-to-interference-plus-noise measurements. A processor 235 may be used to execute applications for BS 201, and may be used to control the operation of units such as codebook adjust unit 206, channel estimate transform unit 230, modulation and coding block 210, scheduler 204, and so forth. Processor 235 may further be used to compute partial channel information from channel information provided in channel quality information feedback 215.

According to an example embodiment, if BS 201 does not receive channel quality information feedback 215, for example, in a TDD communications system, wherein BS 201 may be able to determine its own channel quality information using channel reciprocity, processor 235 may be used to determine channel quality information (such as partial channel information).

Figure 2B:
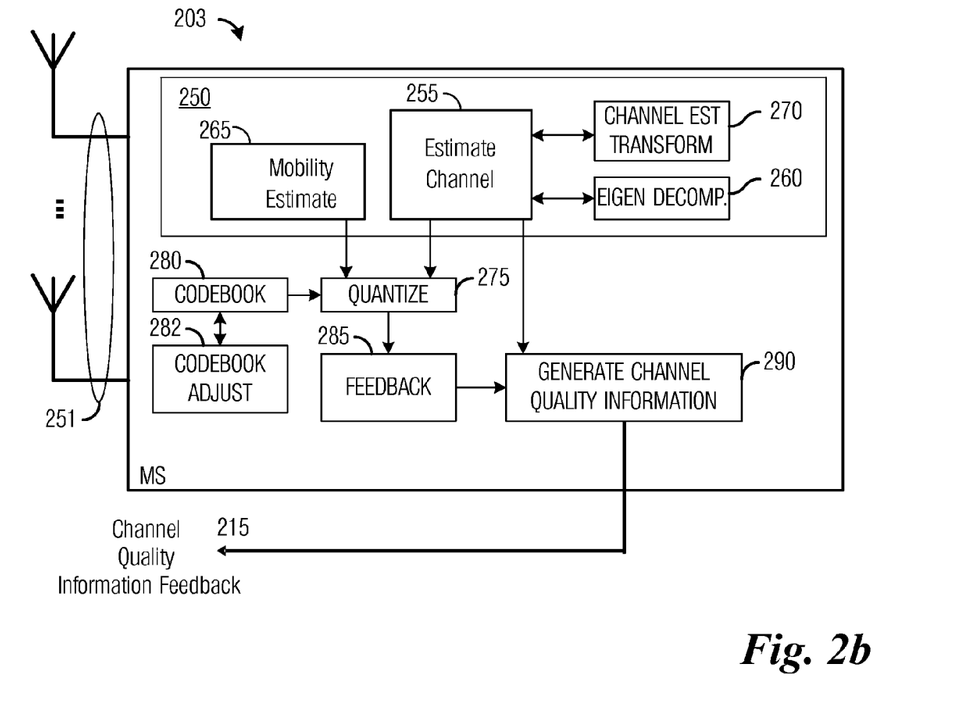
FIG. 2b illustrates an example diagram of a MS according to example embodiments described herein.

FIG. 2b illustrates MS 203. MS 203 may have one or more receive antennas 251, connecting through RF circuitry to a receiver signal processing block 250. Some of the key components of receiver signal processing block 250 include channel estimation block 255, eigen decomposition block 260, and a mobility estimate block 265.

Channel estimation block 255 may employ any number of algorithms known in the art including least squares, maximum likelihood, maximum a postiori, Bayes estimator, adaptive estimator, a blind estimator, or so forth, to estimate a channel between MS 203 and its serving BS. Some algorithms exploit known information inserted into the transmit signal in the form of training signals, training pilots, while others use structure in the transmitted signal such as cyclostationarity structures to estimate coefficients of the channel between the BS and the MS.

When operating in CL mode or enhanced OL mode, eigen decomposition block 260 may be used to compute eigen components of a channel correlation matrix of a channel between MS 203 and its serving BS. According to an example embodiment, eigen decomposition block 260 may make use of eigen decomposition to compute the eigen components from the channel correlation matrix provided by channel estimation block 255, which may then be fedback to the BS serving MS 203. According to an example embodiment, a subset of the total number of eigenvalues are fedback to the BS. For example, if the channel correlation matrix decomposes into four eigen components, then two largest eigen components may be fedback. It may be also possible to further reduce the amount of information fedback to the BS by quantizing the eigenvalues using quantization block 275 using codebook 280.

When quantization is used, codebook 280 may be a baseline codebook as specified by a technical standard, provided by an operator of a communications system that includes MS 203, or so forth. Alternatively, codebook 280 may be an adapted codebook that is originally a baseline codebook that has been adapted using long term channel information (in full or partial form) or a function of long term channel information measured by MS 203. Adaptation of codebook 280 may be performed by codebook adjust unit 282. Codebook adjust unit 282 may adapt codebook 280 using channel information, such as long term channel information measured by MS 203. Codebook 280 may be implemented as a memory capable of storing a number of different codebooks, such as different baseline codebooks for different channel models, different adapted codebooks adapted from different baseline codebooks, and so forth.

Codebook adjust unit 282 may adapt the baseline codebook or some other codebook using a variety of transforms. A transform may be applied to an entirety of a codebook or a portion of a codebook. Furthermore, codebook adjust unit 282 may also increase the size of a codebook (increase the number of codewords in a codebook) to increase quantization accuracy, for example. Codebook adjust unit 282 may also be used to generate a new codebook from an existing codebook by selecting certain codewords from the existing codebook.

A channel estimate transform block 270 may be used to transform a model of the channel between the BS and MS 203. For example, channel estimate transform unit 230 may transform the channel estimate into a subspace of the channel, e.g., a long term channel eigenspace or a wideband channel eigenspace, representation of the channel estimate. The transformation of the model of the channel between the BS and MS 203 may allow for a reduction in the amount of channel feedback information by feeding back a different form of channel feedback information that may be amenable to quantization using codebooks as well as reduced dimensionality, which leads to reduced codebook size, thereby increasing codebook resolution while maintaining constant codebook size or reducing codebook size while maintaining codebook resolution. Transforming the model of the channel with quantization may be shown to be equivalent to codebook quantization of an untransformed model of the channel. A detailed discussion of the transformation of the model of the channel is provided below.

As discussed above, channel state information produced from information provided by channel estimation block 255 may be quantized using a quantization block 275. Quantization block 275 quantizes the channel state information using codebook 280. An index from codebook 280 may be output from quantization block 275. An estimate of the amount of channel variation, produced by mobility estimate block 265, may be used to improve the quantization algorithm by initializing the algorithm from a previous quantization level or adjusting the amount of localization.

Feedback block 285 generates a new feedback message by combining the codebook indices output from quantization block 275. Generate channel quality information block 290 generates a special feedback control message employing the outputs of feedback block 285 to produce channel quality information feedback 215. Generate channel quality information block 290 may also apply an error correcting code to protect information in the feedback message from errors.

The above described embodiments of a BS 201 and MS 203 may also be illustrated in terms of methods comprising functional steps and/or non-functional acts. The following (and subsequent) description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the following description of the flow diagrams(s) for FIGS. 5 and 6—is used to indicate the desired specific use (or non-use) of such terms.

Figure 3:
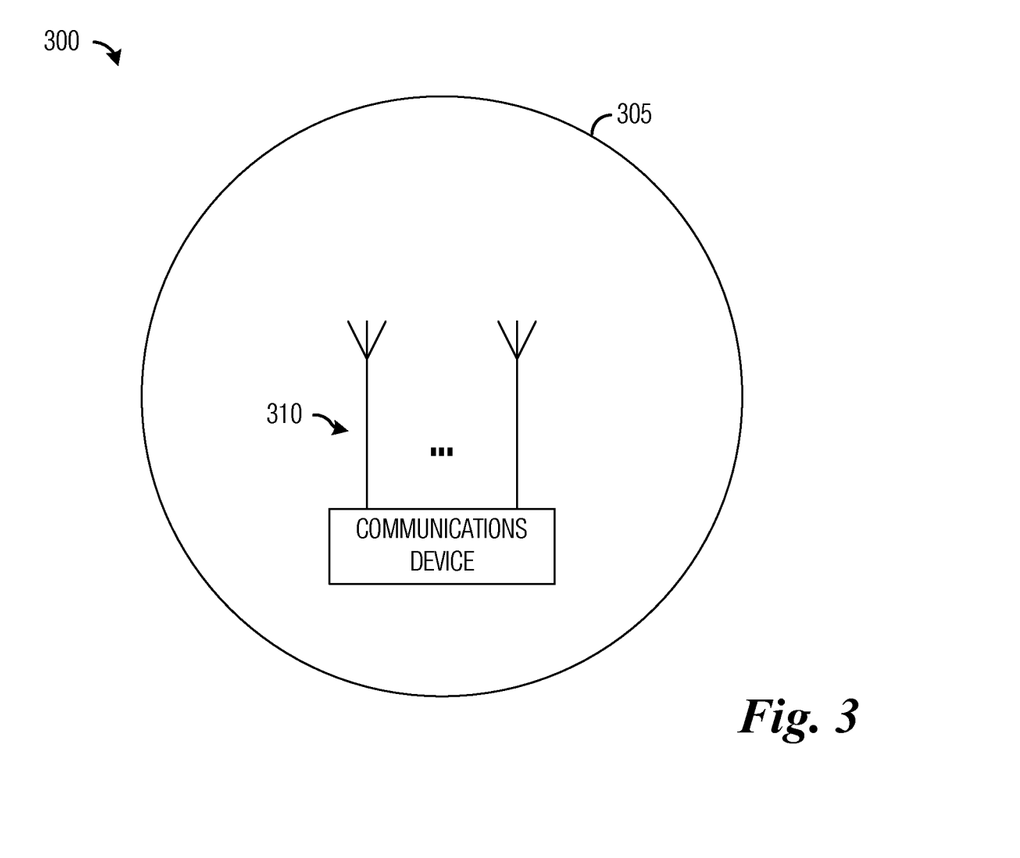
FIG. 3 illustrates an example diagram of a coverage diagram of an antenna array of a communications device that is operating in conventional OL mode according to example embodiments described herein.

FIG. 3 illustrates a coverage diagram 300 of an antenna array of a communications device that is operating in conventional OL mode. FIG. 3 illustrates a coverage pattern 305 of an antenna array 310 of a communications device operating in conventional OL mode. When operating in the conventional OL mode, unless there is prior knowledge of a dispersion of communications devices operating in its coverage area, a typical communications device may have its precoder configured to produce an antenna coverage pattern that is omni-directional in nature. The use of an omni-directional antenna coverage pattern may produce adequate performance for every communications device at the expense of sub-optimal performance for some.

However, with a small amount of channel information, it may be possible for the communications device to adjust its precoder to adapt to actual channel conditions and/or communications device distribution. According to an example embodiment, communications devices operating in enhanced OL MIMO may make use of partial channel information to adjust their precoders to meet actual channel conditions and/or communications device distribution.

According to an example embodiment, the use of partial channel information (time domain partial channel information, frequency domain partial channel information, or a combination thereof), including but not limited to long term channel statistics, wideband channel information, outdated channel information, inaccurate channel information, and so forth, may enable low frequency channel information feedback that does not significantly impact overall communications system performance.

Figure 4A:
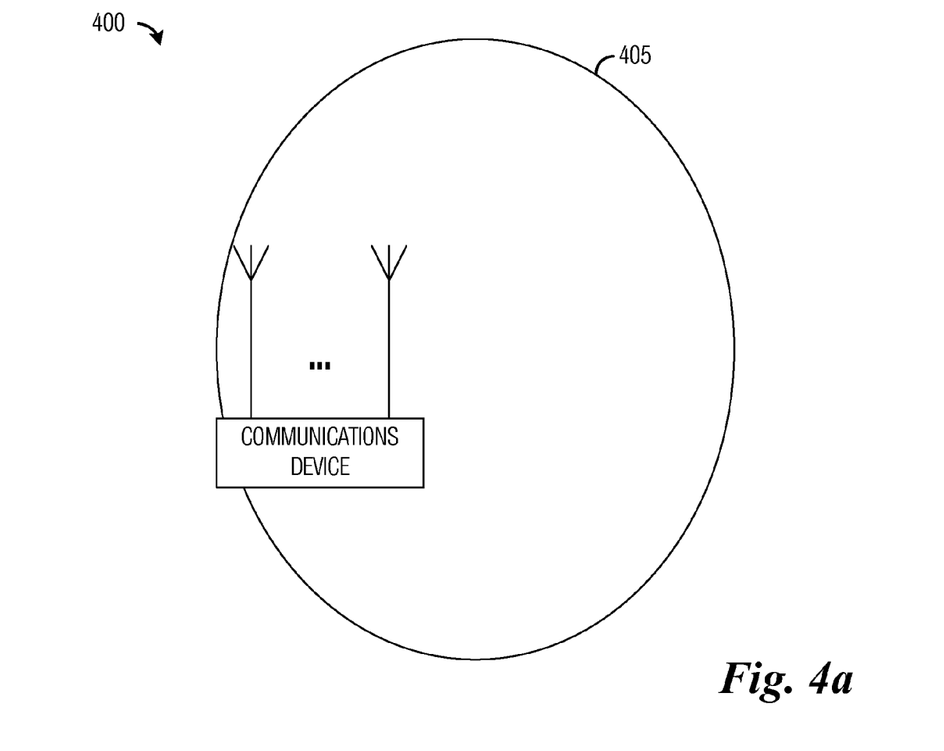
FIG. 4a illustrates an example diagram of a coverage diagram of an antenna array of a communications device that is operating in enhanced OL MIMO according to example embodiments described herein.

FIG. 4a illustrates a coverage diagram 400 of an antenna array of a communications device that is operating in enhanced OL MIMO. According to an example embodiment, the use of partial channel information may allow the communications device to adjust its precoder so that a coverage pattern 405 of its antenna array may be skewed, thereby providing a semi-circular coverage. Compared to coverage pattern 305, coverage pattern 405 may have approximately one-half of the coverage area. However, if consistent transmission power is maintained, the received signal of communications devices operating within coverage pattern 405 may be significantly greater than the communications devices operating within coverage pattern 305.

Figure 4B:
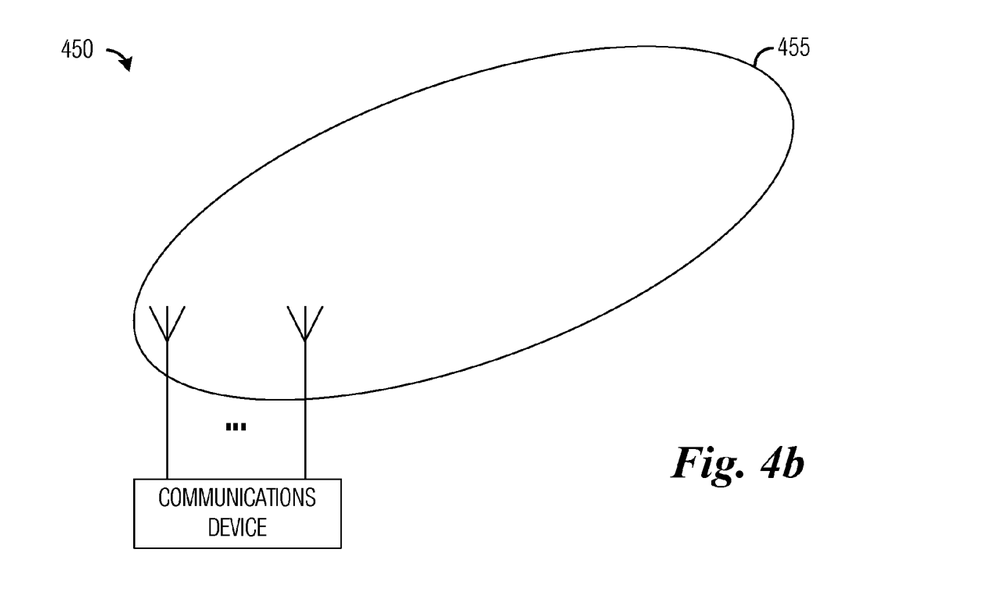
FIG. 4b illustrates an example diagram of a coverage diagram of an antenna array of a communications device that is operating in enhanced OL MIMO according to example embodiments described herein.

FIG. 4b illustrates a coverage diagram 450 of an antenna array of a communications device that is operating in enhanced OL MIMO. As shown in FIG. 4b, the communications device may adjust its precoder to a greater extent that that of the communications device of FIG. 4a, resulting in a coverage pattern 455 of its antenna array being skewed to a greater extent. Coverage pattern 455 may be approximately one-quarter of the coverage area of coverage pattern 305.

Comparing coverage pattern 405 with coverage pattern 455, the smaller coverage area of coverage pattern 455 may be due to an enhanced quality of the partial channel information, aggressiveness of communications device, nature of communications devices operating in the respective coverage areas (e.g., mobility, available MIMO operating modes, and so on), and so forth.

Figure 5:
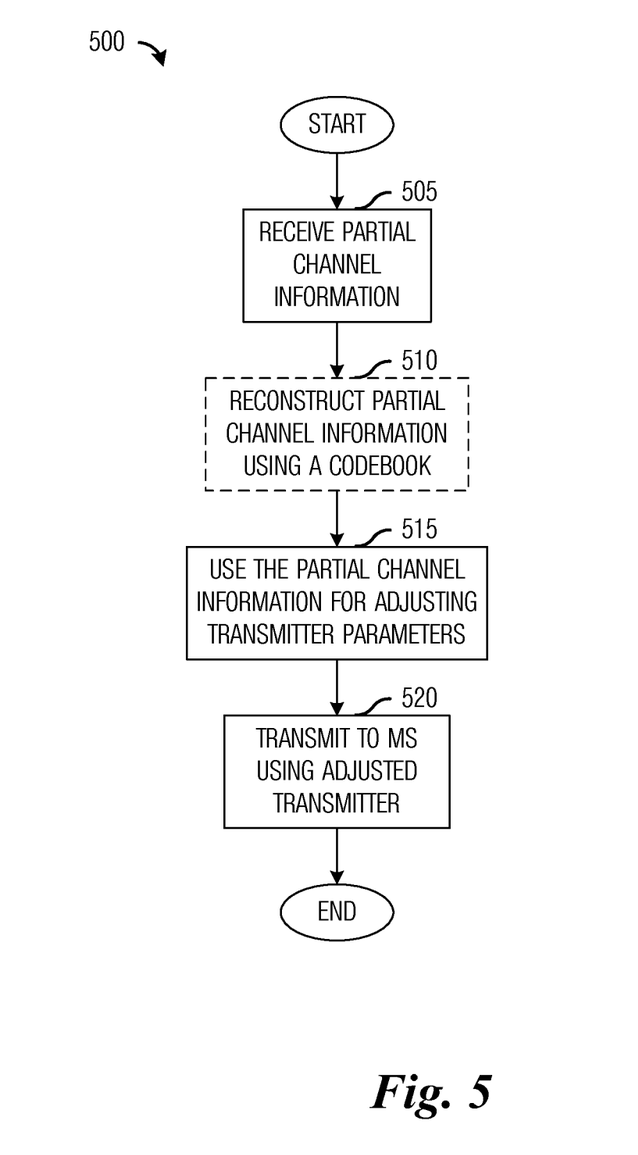
FIG. 5 illustrates an example diagram of a flow diagram of BS operations in transmitting information to MS according to example embodiments described herein.

FIG. 5 illustrates a flow diagram of BS operations 500 in transmitting information to MS. BS operations 500 may be indicative of operations occurring in a BS, such as BS 201, as the BS, operating in enhanced OL MIMO, serves MSs operating within its coverage area. BS operations 500 may occur while the BS is in a normal operating mode, the BS receives partial channel information, and has MSs to serve.

BS operations 500 may include the BS receiving partial channel information from a MS (block 505). According to an example embodiment, the BS may periodically receive partial channel information for a channel between the BS and the MS from the MS if channel reciprocity is not available. If channel reciprocity is available, then the BS may compute and maintain its own partial channel information based on an alternate channel between the BS and the MS. The alternate channel may be a channel corresponding to the channel related to the partial channel information. As an example, in a TDD communications system, a channel may be a downlink channel between the BS and the MS, while the alternate channel may be an uplink channel between the BS and the MS.

Partial channel information, which may include long term channel statistics, wideband channel information, outdated channel information, inaccurate channel information, and so forth, may be fedback (and/or computed) at a low frequency that is significantly lower than that of short term channel information, which may include instantaneous channel values and/or means. As an example, partial channel information may be reported at a rate that is about one tenth, one-one hundredth, or one one-thousandth a rate typically used to report short term channel information.

Even if channel reciprocity is available, the BS may elect to not compute and maintain its own partial channel information at relatively high frequencies, since computing and maintaining partial channel information at high frequencies may consume a significant amount of computational overhead. Therefore, the BS may elect to compute and maintain the partial channel information at the low frequency.

BS operations 500 may further optionally include the BS reconstructing channel information using a codebook (block 510). Codebook quantization is a commonly used technique to help reduce feedback overhead. Instead of transmitting the partial channel information, an index to a codebook that corresponds to a codeword that most closely matches the partial channel information is transmitted. Therefore, a few bits of feedback information (depending on the number of codewords in the codebook) may replace a large number of bits required to transmit the partial channel information.

BS operations 500 may further include the BS using the partial channel information to adjust its precoder (block 515). According to an example embodiment, the precoder of the BS may be generally described as $$p=F_{OL}(T(W)),$$

where $F_{OL}$ represents a generic OL MIMO communications technique, such as Space Time Block Code (STBC), Space Frequency Block Code (SFBC), Cyclic Delay Diversity (CDD), and so on; T( ) is a transformation function and varies with W, by which a channel matrix H is transformed to $\hat{H}=T(W)$; and W is the partial channel information, which may include long term channel information.

A general expression of a received signal at a MS is expressible as $$y=HX,$$

where H is a channel matrix; and X is the transmitted data.

Consider STBC- and/or SFBC-based enhanced OL MIMO, a received signal at a MS may be expressed as $$y = H \times \text{norm}(V(1:2)D^n(1:2)) \times \begin{bmatrix} a & b^* \\ b & -a^* \end{bmatrix},$$

where H denotes a $n_r \times n_t$ channel matrix; V(1:2) is the first two columns of matrix V, which is the eigen-matrix of channel covariance matrix $$R = \sum_i H_i^H H_i = VDV^H;$$

D(1:2)=diag($\lambda_1,\lambda_2$) is a diagonal matrix with the two most significant eigenvalues of R;

$$\begin{bmatrix} a & b^* \\ b & -a^* \end{bmatrix}$$

is the transmitted data according to STBC and/or SFBC operations; a and b are data units themselves; a* is a conjugate of a; and n is a constant. Furthermore, norm( ) represents a Frobenius normalization operation. It is noted that V(1:2) and/or D(1:2) are partial channel information feedback and the transformation function T( ) is defined as $$T(V(1:2),D(1:2))=\text{norm}(V(1:2)D^n(1:2)).$$

Therefore, norm(V(1:2)D$^n$(1:2)) is an adjustment to the received signal expressed in terms of the partial channel information.

Consider CDD-based OL MIMO, a received signal at a MS may be expressed as $$y=H \times K \times U \times M,$$

where H is the channel matrix; K is a predefined $n_t \times r$ precoder, in which r is the number of transmission layer; U is a predetermined rotation matrix; and M is a diagonal matrix with the cyclic phase shifts along its diagonal.

With the use of partial channel information in CDD-based enhanced OL MIMO, a received signal at a MS may be expressed as $$y=H \times \text{norm}(V(1:r)D_r^n) \times U \times M$$

where V(1:r) is the first r columns of eigen-matrix V and $D_r$ represents a r×r diagonal matrix with R's eigenvalues arranged along its diagonal. With partial CSI feedback V(1:r) and $D_r$, the transformation function T( ) is defined as T(V(1:r),$D_r$)=norm(V(1:r)$D_r^n$). Therefore, norm(V(1:r)$D_r^n$) is an adjustment to the received signal expressed in terms of the partial channel information.

Applying the adjustment based on the partial channel information, T(V), to its precoder, the BS may then transmit information to the MS using its adjusted transmitter (precoder) (block 520). Wherein after, BS operations 500 may terminate.

Figure 6:
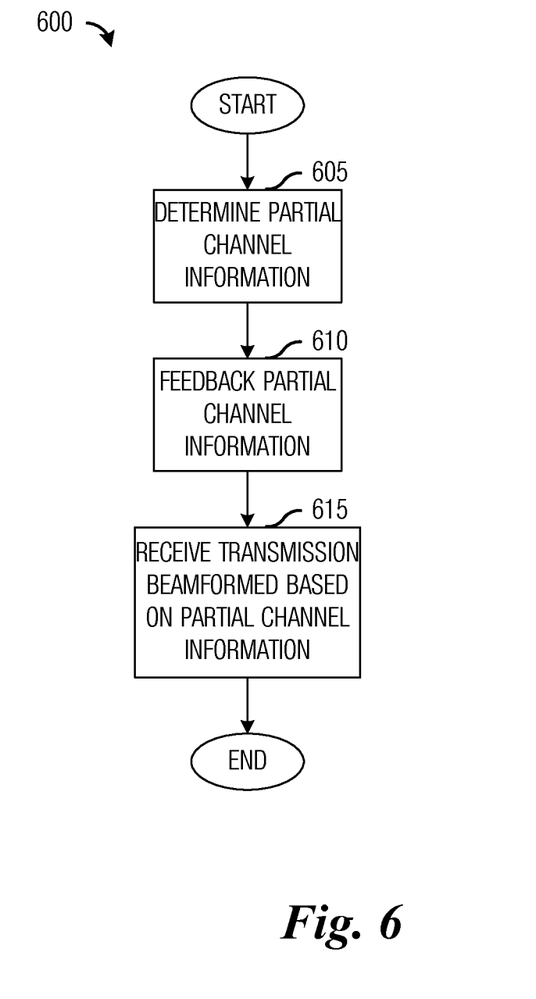
FIG. 6 illustrates an example diagram of a flow diagram of MS operations in receiving information from a BS according to example embodiments described herein.

FIG. 6 illustrates a flow diagram of MS operations 600 in receiving information from a BS. MS operations 600 may be indicative of operations occurring in a MS, such as MS 203, as the MS, operating in enhanced OL MIMO, receives transmissions from its serving BS. MS operations 600 may occur while the MS is in a normal operating mode, and is served by the BS.

MS operations 600 may include the MS determining partial channel information (block 605). According to an example embodiment, the MS may determine partial channel information based on channel measurements based on signals transmitted by the BS. For example, the MS may make use of a pilot signal transmitted by the BS to make channel measurements to determine the partial channel information. Alternatively, the MS may make use of reference signals transmitted by the BS to make channel measurements to determine the partial channel information. Furthermore, instead of using the pilot signal and/or reference signals, the MS may use normal transmissions from the BS to make channel measurements to determine the partial channel information. The MS may use normal transmissions made over time from the BS to determine the partial channel information.

According to an example embodiment, instead of determining the partial channel information directly from the channel measurements, the MS may determine channel information, such as long term channel statistics, wideband channel information, outdated channel information, inaccurate channel information, and so forth, and then determine partial channel information from the channel information.

As an example, consider the above discussion of STBC- and/or SFBC-based OL MIMO, the partial channel information that may be used to adjust the signal to be transmitted comprises $norm(V(1:2)D^n(1:2))$, which is a function of the first two columns of the eigen-matrix of channel covariance matrix $$R = \sum_i H_i^H H_i = VDV^H,$$

and a diagonal matrix with the two most significant eigenvalues of R. Hence, the MS may determine the channel covariance matrix R and feedback to the BS the first two columns of the eigen-matrix of R and the two most significant eigenvalues of R.

Similarly, for CDD-based OL MIMO, the partial channel information that may be used to adjust the signal to be transmitted comprises $norm(V(1:r)D_r^n)$, which is a function of the first r columns of the eigen-matrix of channel covariance matrix $$R = \sum_i H_i^H H_i = VDV^H,$$

and a r×r diagonal matrix with R's eigenvalues arranged along its diagonal. Hence, the MS may determine the channel covariance matrix R and feedback to the BS the first r columns of the eigen-matrix of R and the eigenvalues of R.

MS operations 600 may further include the MS feeding back the partial channel information to the BS (block 610). According to an example embodiment, the MS may help to reduce the feedback overhead by quantizing or otherwise compressing the partial channel information. Examples of techniques that the feedback reduction techniques may include quantization, codebook quantization, and so forth.

According to an example embodiment, the feeding back of the partial channel information may occur at a rate that is substantially lower than typical for short term channel information. For example, the partial channel information may be fedback at a rate that is on the order of 10 to 1000 times lower than the rate for feeding back short term channel information.

MS operations 600 may also include the MS receiving a transmission from the BS, wherein the transmission is beamformed based on the partial channel information provided by the MS. Wherein after, MS operations 600 may terminate.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operations, the method comprising:
adjusting a transmitter used to transmit information in open loop (OL) multiple input, multiple output (MIMO) transmissions, the adjusting based on partial channel information for a channel between a controller and a communications device, wherein the partial channel information comprises a subset of eigenvalues of a time domain channel correlation matrix R for long term channel statistics, wherein the subset of eigenvalues excludes a smallest eigenvalues; and
transmitting to the communications device using the adjusted transmitter.

2. The method of claim 1, wherein partial channel information comprises wideband channel information, outdated channel information, inaccurate channel information, functions thereof, subsets thereof, or a combination thereof.

3. The method of claim 1, wherein the long term channel statistics comprise eigenvectors of the time domain channel correlation matrix R, angle of arrival and/or of departure of the channel, or a combination thereof.

4. The method of claim 1, further comprising receiving feedback information from the communications device.

5. The method of claim 4, wherein the feedback information comprises the partial channel information.

6. The method of claim 4, further comprising determining the partial channel information from the feedback information.

7. The method of claim 4, wherein the feedback information is quantized.

8. The method of claim 7, further comprising reconstructing the partial channel information from the quantized feedback information.

9. The method of claim 4, wherein the feedback information is received at a low frequency.

10. The method of claim 1, further comprising determining the partial channel information from an alternate channel between the controller and the communications device.

11. The method of claim 10, wherein the partial channel information is determined from the alternate channel using channel reciprocity.

12. The method of claim 10, wherein the alternate channel comprises a corresponding channel to a channel related to the partial channel information.

13. The method of claim 1, wherein space time block code or space frequency block code based OL MIMO is used in transmissions, and wherein adjusting a transmitter comprises applying norm(V(1:2)D$^n$(1:2)), where norm( ) represents a Frobenius normalization operation, V(1:2) are first two columns of matrix V, which is an eigen-matrix of a channel covariance matrix $$R = \sum_i H_i^H H_i = VDV^H,$$

D(1:2)=diag($\lambda_1,\lambda_2$) is a diagonal matrix with two most significant eigenvalues of R, H denotes a n$_r$×n$_t$ channel matrix, and n is a constant.

14. The method of claim 1, wherein cyclic delay diversity based OL MIMO is used in transmissions, and wherein adjusting a transmitter comprises applying norm(V(1:r)D$_r^n$), where norm( ) represents a Frobenius normalization operation, V(1:r) are first r columns of matrix V, which is an eigen-matrix of a channel covariance matrix $$R = \sum_i H_i^H H_i = VDV^H,$$

D$_r$ is a r×r diagonal matrix with R's eigenvalues arranged along its diagonal, and n is a constant.

15. A method for communications device operations, the method comprising:
determining partial channel information for a channel between a controller and a communications device, wherein the partial channel information comprises a subset of eigenvalues of a time domain channel correlation matrix R or long term channel statistics, wherein the subset of eigenvalues excludes a smallest eigenvalue;
transmitting the partial channel information to the controller; and
receiving a transmission from the controller, wherein the transmission is precoded according to the partial channel information, and wherein an open loop multiple input, multiple output transmission technique is used.

16. The method of claim 15, wherein the partial channel information comprises wideband channel information, outdated channel information, inaccurate channel information, functions thereof, subsets thereof, or a combination thereof.

17. The method of claim 15, wherein long term channel statistics comprises eigenvectors of the time domain channel correlation matrix R, angle of arrival and/or angle of departure of the channel, or a combination thereof.

18. The method of claim 15, further comprising quantizing the partial channel information.

19. The method of claim 18, wherein codebook quantization is used to quantize the partial channel information.

20. A controller comprising:
a precoder configured to adjust information in open loop (OL) multiple input, multiple output (MIMO) transmissions, the adjusting based on partial channel information for a channel between a controller and a communications device, wherein the partial channel information comprises a subset of eigenvalues of a time domain channel correlation matrix R or long term channel statistics, wherein the subset of eigenvalues excludes a smallest eigenvalue; and
a transmitter coupled to the precoder, the transmitter configured to transmit the adjusted information to the communications device.

21. The controller of claim 20, further comprising a receiver coupled to the precoder, the receiver configured to receive feedback information from the communications device.

22. The controller of claim 21, further comprising a processor coupled to the receiver, the processor configured to compute partial channel information from the feedback information.

23. The controller of claim 21, wherein the feedback information is quantized, and wherein the controller further comprises a feedback decode unit coupled to the receiver, the feedback decode unit configured to reconstruct the feedback information.

24. The controller of claim 20, further comprising a processor coupled to the precoder, the processor configured to compute the partial channel information from an alternate channel between the controller and the communications device.

25. The controller of claim 24, wherein the controller computes the partial channel information from the alternate channel using channel reciprocity.

26. The controller of claim 24, wherein the alternate channel comprises a corresponding channel to a channel related to the partial channel information.

27. The method of claim 1, wherein the partial channel information comprises wideband channel information.

28. The method of claim 1, wherein the partial channel information comprises outdated channel information.

29. The method of claim 1, wherein adjusting the transmitter comprises applying a normalization function to a channel matrix determined according to the partial channel information.

30. The method of claim 29, wherein the normalization function comprises a Frobenius normalization operation.

* * * * *

UNITED STATES PATENT AND TRADEMARK OFFICE
CERTIFICATE OF CORRECTION

PATENT NO. : 8,855,577 B2  
APPLICATION NO. : 13/011639  
DATED : October 7, 2014  
INVENTOR(S) : Yang Tang Page 1 of 1

It is certified that error appears in the above-identified patent and that said Letters Patent is hereby corrected as shown below:

IN THE CLAIMS:
In Col. 14, line 10, claim 20, delete "based on" and insert --performed according to--.

Signed and Sealed this  
Third Day of February, 2015

Michelle K. Lee  
*Deputy Director of the United States Patent and Trademark Office*